United States Patent [19]

Le Vantine

[11] 4,375,316
[45] Mar. 1, 1983

[54] FORWARD VIEW MIRROR FOR BICYCLES

[76] Inventor: Allan D. Le Vantine, 18225 Rancho St., Tarzana, Calif. 91356

[21] Appl. No.: 237,592

[22] Filed: Feb. 24, 1981

[51] Int. Cl.³ .............................................. G02B 7/18
[52] U.S. Cl. .................................. 350/302; 350/287; 248/480
[58] Field of Search ................. 350/30, 301, 307, 297, 350/298, 299, 292, 286, 287, 97, 100, 102, 109, 51, 167; 248/480

[56] References Cited

U.S. PATENT DOCUMENTS 1,434,167 10/1922 Thorner ............................... 350/109
3,058,395 10/1962 Mattsson .............................. 350/302
3,443,072 5/1969 Mori ..................................... 350/102

FOREIGN PATENT DOCUMENTS 2724845 12/1978 Fed. Rep. of Germany ...... 350/301
567520 2/1945 United Kingdom ................ 350/301

Primary Examiner—Jon W. Henry

[57] ABSTRACT

A novel optical device that is mounted on the handlebars of a bicycle and provides a rectified forward looking field of view for a bike rider is bent over the handlebars in the head down bike riding position and looking in downward direction. It consists of a first reflecting surface which receives light from the field of view and directs it to a second reflecting surface which, in turn, directs it to the bike rider.

7 Claims, 10 Drawing Figures

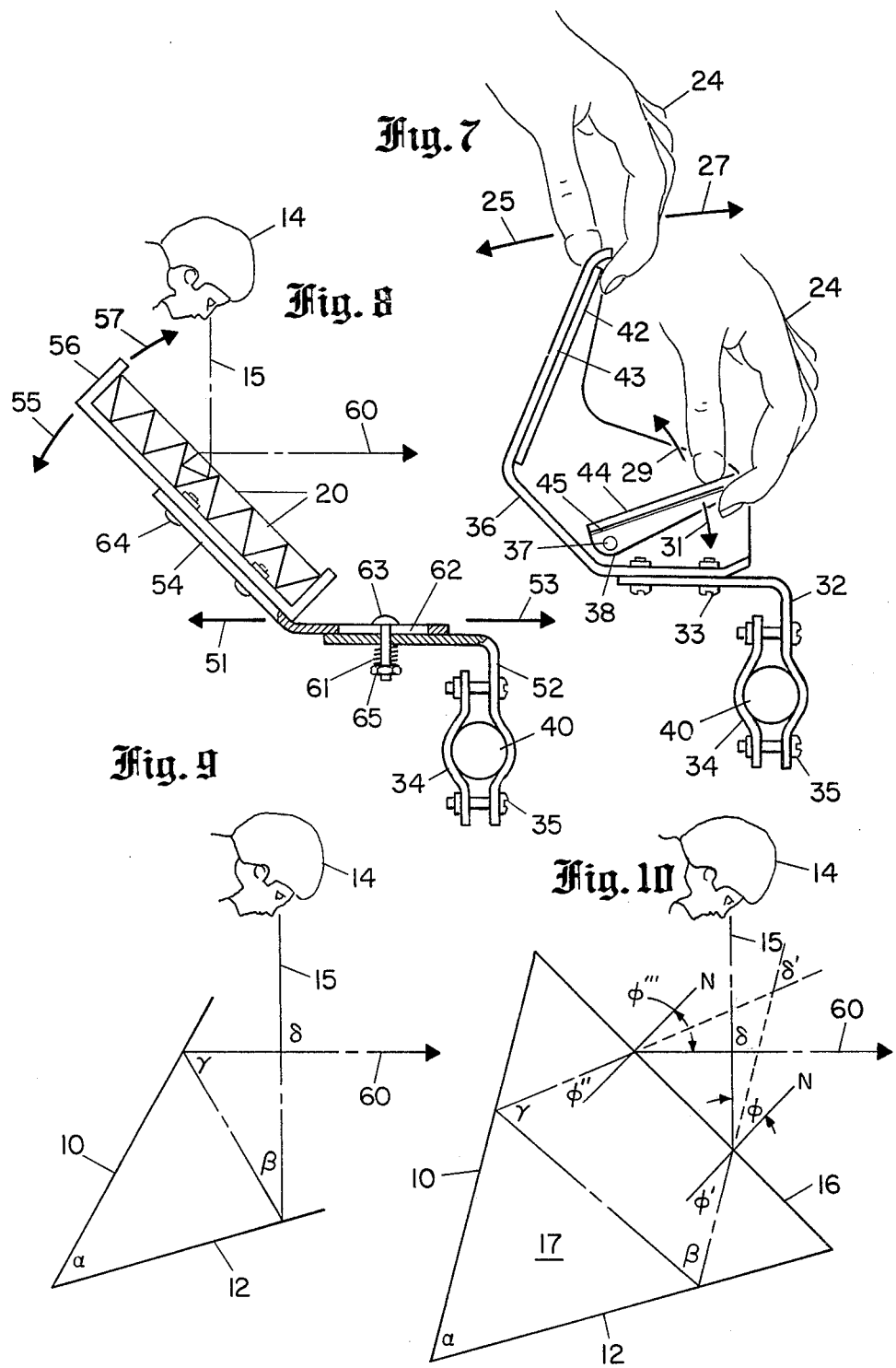

FORWARD VIEW MIRROR FOR BICYCLES

This invention relates to the redirecting of the line of sight for viewing in a forward direction and more specifically to an optical device that provides a rectified forward looking field of view for a bike rider who is bent forward over the handlebars in the head down bike riding position and looking in a downward direction.

The head down bike riding position is the usual posture assumed by a bike rider to minimize wind resistance when traveling at moderate to high biking speeds or when pumping or riding into a headwind. When in this position the bike rider must continually hold his head upward, in an uncomfortable and unnatural position, in order to view the roadway ahead and to see where he is going. Such head upward position results in much discomfort to the rider and forces him either to lower his head from time to time, leaving him riding appreciably blind (with no forward view) for short periods of time, or to sit erect periodically, increasing his wind resistance and slowing his forward speed.

The utilization of a simple mirror, mounted on the handlebars, for the bike rider to look down into and see ahead, in the forward direction, produces an inverted image to the viewer. Such is optically unsuitable and confusing to the rider and would be dangerous to use. It is possibly because of this reason that no evidence of a forward looking mirror for bicycles is apparent in the literature. Although there are forward viewing devices which provide a rectified field, these are all periscopes. For example, see U.S. Pat. Nos. 4,161,352; 4,123,151; 4,033,678; 3,625,599 and many others. In these devices the viewer always looks in the direction he wishes to see, and the device merely translates his viewing position to some other location to provide an unobstructed view of the field ahead. Such devices basically consist of two reflecting surfaces, which reflect the viewed field to the viewer, wherein a first mirror bends the light from the field 90 degrees to a downward direction and a second mirror bends the light again 90 degrees to a horizontal direction parallel to and in the same direction as the incoming light. Such devices are not applicable to the head down viewing requirements for use on bicycles.

It is, accordingly, the objective of the present invention to provide a forward viewing device from the downward looking direction as assumed by bike riders in the head down riding position.

It is another objective of the invention to provide a rectified image for forward viewing.

It is also another objective of the invention to provide a means for adjusting the forward viewing device to accomodate the specific position of the individual user because of his physical size and the dimensions of the bike.

Briefly stated and in accord with the presently preferred embodiments of the invention, a viewing device is provided which consists primarily of two flat specular reflecting surfaces disposed relative to the viewer and to the field of view such that when the viewer looks down into the second reflecting surface he sees an erect view of the field in front of him in the first reflecting surface. More specifically, the embodiments can be designed and constructed by three methods, all of which incorporate the same basic optical principles. One embodiment incorporates two plane mirrors supported on a suitable framework. The second consists of a solid transparent material suitably shaped and treated to provide the proper reflecting arrangement. The third embodiment consists of a multiplicity of solid transparent materials appropriately shaped and fitted together as one unit.

For a complete understanding of the invention together with an appreciation of the objectives and ramifications thereof, please refer to the attached drawings and the following descriptions of the drawings in which:

FIG. 7 is a cross section of a complete design of the invention utilizing the embodiment of FIG. 1.

FIG. 8 is a cross section of a complete design of the invention utilizing the embodiment of FIG. 5.

FIG. 9 is a schematic defining the optical angles of the design of the embodiment of FIG. 1.

FIG. 10 is a schematic defining the optical angles of the embodiments of FIGS. 3 and 5.

Figure 1:
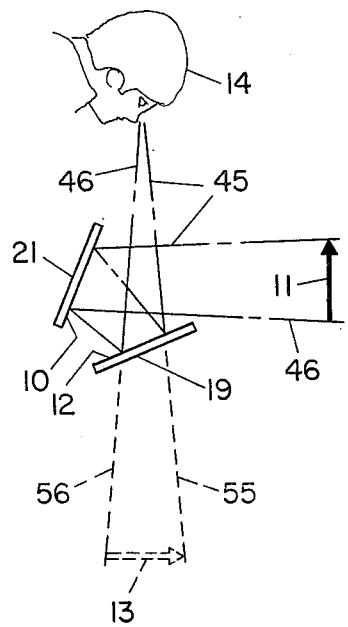
FIG. 1 is a cross section of one embodiment of the invention (excluding supporting structures).
Figures 2, 3:
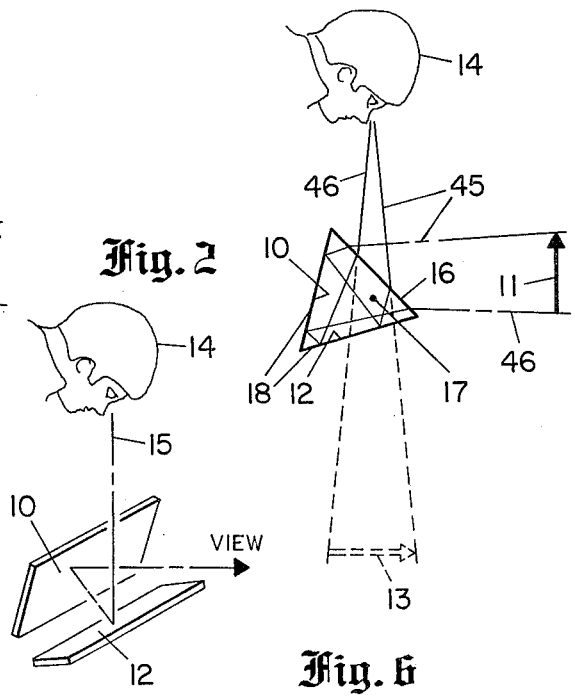
FIG. 2 is a perspective view of FIG. 1.
FIG. 3 is a cross section of second embodiment of the invention (excluding supporting structures).

The embodiments of the invention are envisioned, but not specifically limited to being, mounted on the handlebars 40 of a bicycle as shown in FIGS. 7 and 8. The first embodiment of the principle of the invention is shown in FIGS. 1 and 2, light rays 45 and 46 from an object 11 in the field of view, impinges upon the flat reflecting surface 10 of first mirror 21. The rays are reflected from surface 10 to flat reflecting surface 12 of second mirror 19. Reflecting surface 12 in turn reflects rays 45 and 46 to the bike rider 14. Bike rider 14 looking down into second mirror 19, sees a reflected image 13 of object 11 by means of virtual rays 55 and 56. Thus, as the bike rider looks down into the device embodying the invention he sees before him a true rectified view of the field ahead. This can be seen from FIG. 1 by tracing ray 45 from the head of object 11 to rider 14 and observe that it aligns with virtual ray 55 from the head of image 13. The direction of the view 15 can be clearly seen in the perspective drawing of FIG. 2. The angular orientation of the mirrors will be discussed later.

Figure 4:
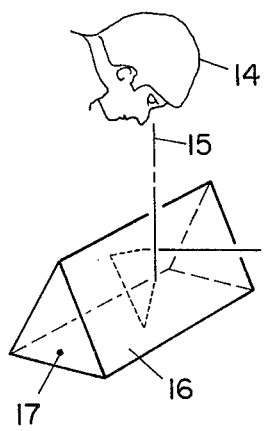
FIG. 4 is a perspective view of FIG. 3.

In the second embodiment, shown in FIGS. 3 and 4, the reflecting surfaces are the internal surfaces of an optically transparent solid material 17 such as glass or plastic. The material 17 is appreciably triangular in cross section with sides 10, 12 and 16 and rectangular in width as shown in FIG. 4. Light rays from object 11, in the field of view, pass through surface 16 where they are slightly refracted in accordance with the index of refraction of the material 17 and Snell's Law which defines such refraction. The rays then impinge on the surface 10 which has been made reflective by the addition of a reflective coating 18 to the external side of surface 10. The angles of surface 10 with respect to the incoming rays 45 and 46 is such that the rays are reflected toward prism surface 12. Surface 12 has also been coated on its external side with a reflective coating 18 and is so oriented that it reflects the rays 45 and 46 through surface 16 where it is again refracted in accordance with Snell's Law and impinges upon the eyes of the bike rider 14. The bike rider thus sees a doubly reflected image of object 11 which appears as an erect virtual image 13.

Figures 5, 6:
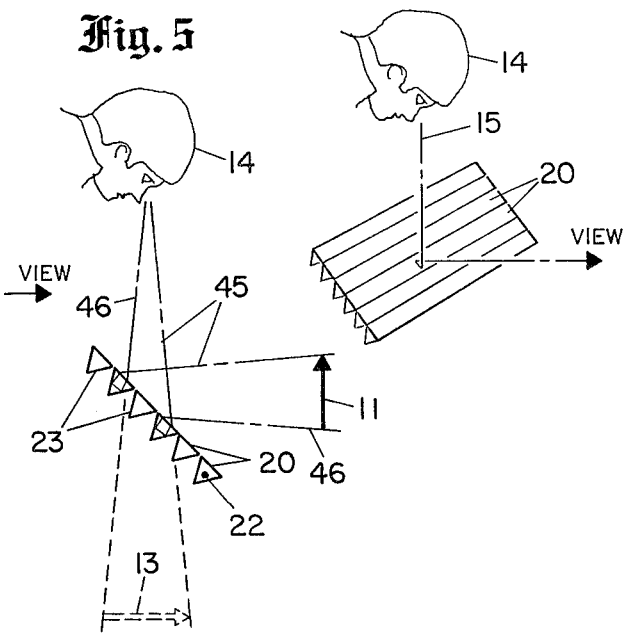
FIG. 5 is a cross section of a third embodiment of the invention (excluding supporting structures).
FIG. 6 is a perspective view of FIG. 5.

The third embodiment of the principle is shown in FIGS. 5 and 6. This embodiment consists of a multiplicity of triangular solid transparent elements 22 fitted together as one integral array 20 with the transparent surfaces of the elements aligned in a common plane, and a reflective coating 23 applied to the opposite surfaces. Each unit is identical and is designed in accord with the relationships set forth for the design of element 17 above. However, elements of 20 are much smaller in cross section such that each element 22 transmits only a small portion of the field of view represented by object 11. A composite of object 11 is built up by transmission and reflection, of contiguous sections of the field of view, through several elements. The bike rider looking down into the array sees a rectified composite image 13 of object 11.

One design utilizing the principles set forth in the first embodiment, FIG. 1, is shown in cross section in FIG. 7. It consists of case means 36, which is the supporting structure for mirrors 42 and 44. Mirror 42 consists of a transparent material and has a silver reflecting coat 43 on its rear surface and mirror 44 similarily has a reflecting coat 45 on its rear surface. Mirror 42 is cemented directly to case 36. Mirror 44 is cemented to shelf 38. Shelf 38 is affixed to case 36 by means of rivets 37 through its flanges which allow shelf 38 to pivot about 37 with respect to case 36. However, rivets 37 apply sufficient friction between case 36 and shelf 38 to prevent any movement between the two without application of sufficient torquing force. In this design case 36 is constructed of a plastic material and shelf 38 is constructed of sheet metal.

Case means 36 is attached rigidly to handlebar brackets 32 by means of screws 33. Bracket 32 is affixed to handlebars 40 by means of clip 34 and screws 35. Screws 35 are tightened to create a tension about handlebars 40 sufficient to hold the device in place, however the tension is moderate enough to permit the device to be rotated about 40, by application of sufficient torque, to allow the device to be moved to any desired location. The brackets in this design are constructed of metal.

To use the design shown in FIG. 7 the bike rider looks down into the lower mirror. He grasps the forward edge of mirror 44 and shelf 38 between the thumb and forefinger of one hand 24, and moves it up or down in directions 29 or 31 until the roadway ahead of him is brought into proper view. Moving the mirror in direction 29 brings the field of view downward toward the roadway while moving the mirror in direction 31 moves the field of view upward away from the roadway.

Once the bike rider has achieved the desired field of view in mirror 44 he then grasps the upper part of case means 36 with the thumb and forefinger of hand 24 and moves it forward or rearward in directions 27 or 25, rotating the entire device about handlebars 40 until he sees the largest possible field of view of the roadway ahead through the two mirrors 44 and 42. The device is now properly adjusted.

Another design which utilizes the principles set forth in FIGS. 3 and 5 is shown in FIG. 8. It consists of an array of a multiplicity of prism like elements 17 or 22 combined into a unit 20 and retained in a case means 56. Case means 56 is attached to two angle fixtures 54 by screws 64. Each angle fixture 54 has in one leg a slotted section 62. A screw 63 fits through slot 62 in each angle fixture 54 and additionally through a hole in each accompanying bracket 52. Spring 61 and nut 65 on the lower portion of screw 63 apply sufficient tension to hold the angle fixture and the bracket together while at the same time allowing angle fixture 54 to slide in directions 51 and 53, by means of the leeway provided by slot 62, if sufficient force is applied. Brackets 52, of which there are two, one corresponding to each angle fixture, are attached to handlebars 40 by means of clips 34 and screws 35 identical to that of the design of FIG. 7. Also, as in the design of FIG. 7, the clips and screws clamp the brackets 52 with sufficient tension to hold the device fixed on handlebars 40 but will permit movement about the handbars if sufficient torque is applied.

To use this design the bike rider 14 looks down into the device and slides it forward or rearward in directions 53 or 51 until he sees the desired view of the roadway ahead of him. Moving the device in direction 51 directs his field of view downward into the roadway. Moving it in the direction of 53 moves his field upward away from the roadway. Once the proper view of the field ahead has been achieved the device is then rotated about handlebars 40 in directions 55 or 57 until the largest field of view is achieved. The device is now properly adjusted.

In the design of these systems size of the field of view depends directly on the size of the elements selected and the distance of the viewers eyes from the elements. It has been ascertained from experience that a satisfactory field of view in the horizontal plane is on the order of 40° while a much lesser angle of 10° is sufficient in the vertical plane.

The angles relating the mirrors and the optical viewing path shown in FIGS. 1 and 7 are described in FIG. 9. The optical path 15 between the bike rider 14 and the field of view 60 reflects through angle $\beta$ from reflecting surface 12 and through angle $\gamma$ from reflecting surface 10. $\delta$ defines the angle between the line of viewing and the line of the field. $\alpha$ is the angle between the reflecting surfaces. The following equivalence can be established from the geometry of the figure:

$$2\alpha = \gamma + \beta = \pi - \delta$$

From which the angle between the mirrors is derived as:

$$\alpha = (\pi - \delta)/2$$

The angles relating to the design of element 17 and 22 in FIGS. 3 and 5 are described in FIG. 10. From the figure the following geometric and optical relations can be established.

$$2\alpha = \gamma + \beta = \pi - \delta'$$
$$\delta' = \phi' + \phi''$$
$$\phi' = \sin^{-1} \frac{\sin \phi}{n}$$
$$\phi'' = \sin^{-1} \frac{\sin \phi'''}{n}$$

In accordance with Snell's Law where; n is the index of refraction of the optical material used to fashion element 17.

From the above the general equation relating to the above design is derived as follows:

$$\alpha = \tfrac{1}{2}\pi - \tfrac{1}{2}\left(\sin^{-1}\frac{\sin\phi}{n} + \sin^{-1}\frac{\sin\phi'''}{n}\right)$$

However, for a practical approach to design it can be realized that the angles $\phi$ and $\phi'''$ would be equal when the system is oriented to provide the maximum field of view. Therefore, the following special equation can be written which defines the angles of the system.

$$\alpha = \frac{\pi}{2} - \sin^{-1}\frac{\sin\delta/2}{n}$$

While the principles of the invention are thus disclosed and three embodiments are described in detail, it is not intended that the invention be limited to these embodiments. It is recognized that many modifications will occur to those skilled in the art which lie within the spirit and scope of this invention. It is intended that the invention cover such modifications and be limited in scope only by the appended claims.

What is claimed is:

1. The combination of a bicycle having handlebars, of: a forward viewing optical arrangement having a first forwardly and downwardly facing plane mirror, a second plane mirror spaced apart from the first plane mirror, at a location foward and below the first plane mirror, so as to receive the reflected image from the first plane mirror, said second plane mirror facing rearwardly and upwardly so that the reflected image of the first plane mirror will be directed upwardly toward the eyes of the bicycle rider who is looking in a downward direction, said plane mirrors being mounted in a case means having mounting means which affix the case means to the handlebars, said case means having an angular adjustment means about a horizontal axis transverse to the forward direction of the bicycle, said first plane mirror being rigidly affixed to said case means, and said second plane mirror having an angular adjustment means within the case means about an axis parallel to the case means angular adjustment axis, said angular adjustments to accomodate the viewing requirements of the bicycle rider.

2. The combination as specified in claim 1 wherein said mounting means is comprised of one or more brackets rigidly affixed to the case means at their upper end and having clamp means at their lower ends which fit around and hold the brackets to the handlebars, said clamp means having bolts by which the tension of the clamps can be adjusted such that the case means will remain in a fixed position or may be angularly adjusted by application of sufficient manual torque to overcome the friction of the clamps and to cause it to rotate about the handlebars.

3. The combination as specified in claim 1 wherein said second plane mirror angular adjustment means is comprised of a shelf within the case means to which the second plane mirror is affixed, said shelf having axial aligned pivots on either side, said pivots incorporating frictional resistance to be overcome for motion, such that the shelf will remain stationary or may be angularly adjusted by application of sufficient manual torque.

4. The combination of a bicycle having handlebars, of: a forward viewing optical element comprised of a solid optically transparent material of triangular cross section and with three rectangular plane surfaces, said first surface being transparent and said second and third surfaces being internally reflecting, said first surface facing forwardly and upwardly through which light from an image passes and is refracted slightly downward onto the second surface, said second surface being internally reflecting and facing in a forwardly and downwardly direction reflects and redirects the image passing through the first surface toward the third surface, said third surface being internally reflecting and facing in a forwardly or upwardly direction reflects and redirects the image from the second surface upward and through the first surface, said first surface refracts and transmits the image from the third surface upwardly toward the eyes of the bicycle rider who is looking in a downward direction, said optical element being supported by a case means to the handlebars, said case means having an angular adjustment means about a horizontal axis transverse to the forward direction of the bicycle, said mounting means incorporating a translation means such that the optical element can be moved forwardly and rearwardly to accomodate the viewing requirements of the bicycle rider.

5. The combination as specified in claim 4 wherein said mounting means is comprised of one or more brackets rigidly affixed to the case means at their upper ends and having clamp means at their lower ends which fit around and hold the brackets to the handlebars, said clamp means having bolts by which the tension of the clamps can be adjusted such that the case means will remain in a fixed position or can be angularly adjusted by application of sufficient manual torque to overcome the friction of the clamps and to cause it to rotate about the handlebars, said brackets being configured such that the mid portions thereof are disposed in a common near horizontal plane, said brackets each being comprised of two parts, such parts being slotted and held together by a spring loaded pin through the slot such that one part can slide along the other in a forwardly and rearwardly linear translating motion.

6. The combination of a bicycle having handlebars, of: a forward viewing optical device comprised of a plurality of identical optical elements each comprised of a solid optically transparent material of triangular cross section and with three rectangular surfaces, said first surface of each being transparent and said second and third surfaces of each being internally reflecting, said first surfaces facing forwardly and upwardly through which light from portions of an image pass and are refracted slightly downward onto the second surfaces, said second surfaces being internally reflecting and facing in a forwardly and downwardly direction reflect and redirect the portions of the image passing through the first surfaces toward the third surfaces, said third surfaces being internally reflecting and facing in a forwardly and upwardly direction reflect and redirect the portions of the image from the second surfaces upward and through the first surfaces, said first surfaces refract and transmit the portions of the image from the third surfaces upwardly toward the eyes of the bicycle rider who is looking in a downward direction, said plurality of optical elements being arranged adjacent to each other in parallel order with the acute edges of each element in contact with its neighbor and with all first surfaces in a common plane such that the portions of the image from each element combine to present a complete image to the eyes of the bicycle rider, said plurality of optical elements being supported by a case means having mounting means which affix the case means to the handlebars, said case means having an angular adjustment means about a horizontal axis transverse to the forward direction of the bicycle, said mounting means incorporating a translation means such that the plurality of optical elements can be moved as a unit forwardly and rearwardly to accomodate the viewing requirements of the bicycle rider.

7. The combination as specified in claim 6 wherein said mounting means is comprised of one or more brackets rigidly affixed to the case means at their upper ends and having clamp means at their lower ends which fit wround and hold the brackets to the handlebars, said clamp means having bolts by which the tension of the clamps can be adjusted such that the case means will remain in a fixed position or can be angularly adjusted by application of sufficient manual torque to overcome the friction of the clamps and to cause it to rotate about the handlebars, said brackets being configured such that the mid portions thereof are disposed in a common near horizontal plane, said brackets each being comprised or two parts, such parts being slotted and held together by a spring loaded pin through the slot such that one part can slide along the other in a forwardly and rearwardly linear translating motion.

* * * * *